US011501447B2

(12) United States Patent
Yang et al.

(10) Patent No.: US 11,501,447 B2
(45) Date of Patent: Nov. 15, 2022

(54) DISENTANGLED FEATURE TRANSFORMS FOR VIDEO OBJECT SEGMENTATION

(71) Applicant: Lemon Inc., Grand Cayman (KY)

(72) Inventors: Linjie Yang, Los Angeles, CA (US);
Ziyu Jiang, Los Angeles, CA (US);
Ding Liu, Los Angeles, CA (US);
Longyin Wen, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 17/192,599

(22) Filed: Mar. 4, 2021

(65) Prior Publication Data

US 2022/0284590 A1 Sep. 8, 2022

(51) Int. Cl.
*G06K 9/00* (2022.01)
*G06T 7/174* (2017.01)
*G06K 9/62* (2022.01)
*G06V 20/40* (2022.01)
*G06T 7/194* (2017.01)

(52) U.S. Cl.
CPC ............ *G06T 7/174* (2017.01); *G06K 9/6215* (2013.01); *G06V 20/49* (2022.01); *G06T 7/194* (2017.01); *G06T 2207/10016* (2013.01)

(58) Field of Classification Search
None
See application file for complete search history.

(56) References Cited

U.S. PATENT DOCUMENTS 11,176,381 B2 * 11/2021 Lee ...................... G06K 9/6256
2013/0121577 A1 5/2013 Wang et al.

FOREIGN PATENT DOCUMENTS

CN 111652899 A 9/2020
WO 2020035661 A1 2/2020

OTHER PUBLICATIONS

Oh et al., "Video object segmentation using space-time memory networks", 2019 (Year: 2019).*
International Search Report dated May 23, 2022 in International Application No. PCT/SG2022/050111.

* cited by examiner

*Primary Examiner* — Soo Jin Park
(74) *Attorney, Agent, or Firm* — Faegre Drinker Biddle & Reath LLP

(57) ABSTRACT

Systems and method directed to performing video object segmentation are provided. In examples, video data representing a sequence of image frames and video data representing an object mask may be received at a video object segmentation server. Image features may be generated based on a first image frame of the sequence of image frames, image features may be generated based on a second image frame of the sequence of image frames; and object features may be generated based on the object mask. A transform matrix may be computed based on the image features of the first image frame and image features of the second image frame; the transform matrix may be applied to the object features resulting in transformed object features. A predicted object mask associated with the second image frame may be obtained by decoding the transformed object features.

20 Claims, 12 Drawing Sheets

DISENTANGLED FEATURE TRANSFORMS FOR VIDEO OBJECT SEGMENTATION

BACKGROUND

Video object segmentation aims to separate foreground objects from background regions in a video sequence. Video object segmentation is an important task in video analysis and editing and often requires significant manual interaction to achieve satisfactory results. Semi-supervised video object segmentation (Semi-VOS) segments object instances of interest from video sequences, given a fine-grained mask in the first frame is provided. While Semi-VOS has broad applications in robotics, autonomous driving, and video editing tasks, most of Semi-VOS implementations require real-time responses and therefore, speed and quality become limiting factors. Early Semi-VOS methods relied on a provided mask to fine-tune a network to fit target objects during inference, leading to slow execution speeds. Accordingly, some Semi-VOS methods remove the fine-tuning step by extracting information from provided masks and corresponding images in a feed-forward manner to predict masks for specific objects. However, such methods are still time consuming and different object masks require separate processing. As an example, the Space-Time Memory (STM) method proposes a three-step process and includes feature encoding, correlation-based feature transformations, and feature decoding. Such a process requires object masks and the related images to be encoded by a heavy encoder network to generate object specific memory features; in addition, feature transforms are recomputed for each object. The fast end-to-end embedding learning for video object segmentation method (FEELVOS) uses a semantic pixel-wise embedding together with a global and a local matching mechanism to transfer information from the first frame and from the previous frame of the video to the current frame. However, FEELVOS requires the computation of high resolution feature maps to preserve feature details; accordingly, FEELVOS may require high computational resources and may execute at a speed that is slower than other encoding-decoding approaches.

It is with respect to these and other general considerations that embodiments have been described. Although relatively specific problems have been discussed, it should be understood that the examples described herein should not be limited to solving the specific problems identified in the background above.

SUMMARY

In accordance with examples of the present disclosure, systems and methods directed to a disentangled feature transform architecture that disentangles the feature computation for individual objects. Specifically, pairwise feature transforms propagate information from previous frames to a current frame that is agnostic to any object in a video sequence. Object-specific features are then computed using an efficient lightweight network. A feature decoding module is also included and shares decoded image features across multiple target objects. In this way, the disentangled feature transform architecture requires a single pass of feature encoding and decoding of each image, and minimally adds computational costs for each object.

In accordance with at least one example of the present disclosure, a method for performing video object segmentation is described. The method may include receiving video data representing a sequence of image frames, receiving an object mask, generating image features based on a first image frame of the sequence of image frames, generating object features based on the object mask, generating image features based on a second image frame of the sequence of image frames, computing a transform matrix based on the image features of the first image frame and the image features of the second image frame, applying the transform matrix to the object features resulting in transformed object features, and obtaining a predicted object mask associated with the second image frame by decoding the transformed object features.

In accordance with at least one example of the present disclosure, a system configured to perform video object segmentation is described. The system may include a processor, and memory including instructions, which when executed by the processor, causes the processor to: receive video data representing a sequence of image frames, receive an object mask, generate image features based on a first image frame of the sequence of image frames, generate object features based on the object mask, generate image features based on a second image frame of the sequence of image frames, compute a transform matrix based on the image features of the first image frame and the image features of the second image frame, apply the transform matrix to the object features resulting in transformed object features, and obtain a predicted object mask associated with the second image frame by decoding the transformed object features.

In accordance with at least one example of the present disclosure, a computer-readable storage medium including instructions for performing video object segmentation is described. The computer-readable storage medium may include instructions, which when executed by a processor, cause the processor to: receive video data representing a sequence of image frames, receive an object mask, generate image features based on a first image frame of the sequence of image frames, generate object features based on the object mask, generate image features based on a second image frame of the sequence of image frames, compute a transform matrix based on the image features of the first image frame and the image features of the second image frame, apply the transform matrix to the object features resulting in transformed object features, and obtain a predicted object mask associated with the second image frame by decoding the transformed object features.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
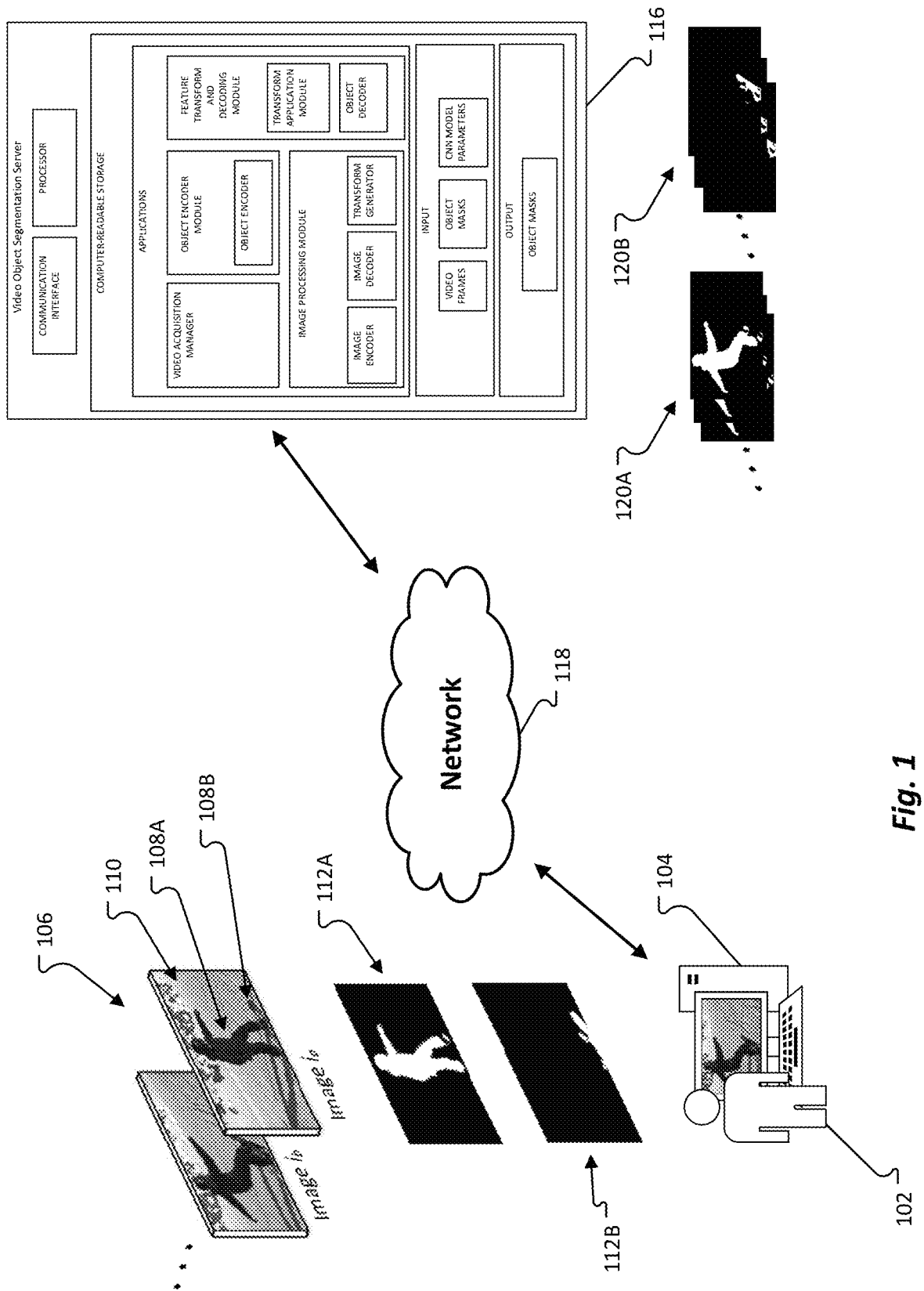
FIG. 1 depicts a semi-supervised video object segmentation (semi-VOS) system in accordance with examples of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Video object segmentation aims to separate foreground objects from background regions in a video sequence. Semi-supervised video object segmentation (Semi-VOS) segments object instances of interest from video sequences, when a fine-grained mask in the first frame is provided. While Semi-VOS has broad applications in robotics, autonomous driving, and video editing tasks, most of Semi-VOS implementations require real-time responses and therefore, speed and quality become limiting factors. Methods for performing for semi-VOS can be generally categorized into two categories: online adaptation methods that require fine-tuning of the model based on target objects, and matching-based methods that learn to match and propagate the initial masks to subsequent video frames.

Online adaptation methods generally utilize given ground truth video as a training samples and tune neural networks using feature similarity to avoid the separate processing associated with each object. However, online adaptation methods tend to require high resolution feature maps to preserve feature details, increasing the amount of required computations and therefore slowing the execution of such processes. Matching-based methods typically utilize a given mask in a feed-forward manner and are faster than online adaptation methods. For example, a mask of a preceding frame is used as input and refined based on the target object. Some matching-based methods match features of a current frame with those features of a first frame and/or previous frames to predict object masks; however, most matching-based methods tend to be computation inefficient and exhibit high computational costs.

More efficient VOS methods may utilize a global context module to encode temporal features of previous frames for efficient retrieval of temporal information. In some examples, reinforcement learning is utilized to select matching methods and up-date object templates. Some examples leverage a two stream design to dynamically focus on a region around the target object. Though an improvement in speed may be realized, such methods still require a significant amount of time to process multiple objects in a video since most computations cannot be shared across different objects. For example, image features and/or transform matrices may not be shared amongst different objects when predicting object masks. Accordingly, additional computations may be necessary to generate image features and the transform matrices that are generated specific to each object. In FEELVOS, for example, different objects may share the same feature map to compute feature similarities, which are further refined into masks. However, the feature maps are generated at a high resolution which slows the object segmentation process.

In accordance with examples of the present disclosure, a disentangled feature transform architecture that disentangles the feature computation for individual objects is described. Specifically, pairwise feature transforms propagate information from previous frames to a current frame that is agnostic to any object in video sequences. Object-specific features are then computed using an efficient lightweight network. A feature decoding module shares decoded image features across multiple target objects. In this way, the disentangled feature transform architecture encodes and decodes the features of each image once, minimally adding computational costs for each added object.

The disentangled feature transform (DiFT) network, as described herein, separates a processing framework into two major portions to achieve significant performance increases in execution speed. First, an image processing backbone generates both multi-scale image features and cross-frame feature transforms. Second, the DiFT network may include an object specific portion to incorporate masks. Processed image features and correlation maps may be reused for feature transforms among different masks, boosting the processing speed for multiple-object scenarios. In addition, multi-scale image features can be reused to generate object specific features using a lightweight network to fuse mask features and image features.

In accordance with examples of the present disclosure, proposed DiFT network includes three modules: the image processing backbone, the object encoding module, and the feature trans-form and decoding module. The image processing back-bone generates global features, which are disentangled from specific objects in the image. Using the global features, cross-frame attention maps can be generated that are used to transform features for each individual object at a later stage. Such attention maps are hereby denoted as transform matrices for clarity. The object encoding module incorporates masks of specific objects with generated image features. Specifically, the features from an image encoder would be combined with the features of masks at a light mask encoder to produce mask features. The collected transform matrices (e.g., attention maps) generated from image features are applied to corresponding mask features to produce transformed features. A lightweight object decoder may combine the transformed features with shared features from the image decoder to output the mask predictions. By leveraging global image features, each object can be processed utilizing a decreased amount of computations. For example, the DiFT network can encode each image, generating features for both mask predictions and temporal feature encoding, using a single pass. Accordingly, the DiFT network can operate at an increased speed for both single-object and multi-object instances.

FIG. 1 depicts a semi-supervised video object segmentation (semi-VOS) system 100 in accordance with examples of the present disclosure. More specifically, a user 102 may acquire or otherwise obtain a video clip or sequence of image frames 106. The sequence of image frames 106 may include one or more objects 108 that are to be segmented or otherwise separated from a background of the image. For example, a user 102 may desire to segment the first object 108A corresponding to a person and the second object 108B corresponding to a snowboard from the background 110 in each image frame of the sequence of image frames 106. In examples, the user 102 may utilize a computing device 104 to acquire and transmit the sequence of image frames 106 to the video object segmenting server 122 via the network 118. The computing device 104, although depicted as a desktop computer for example, may be any one of a portable or non-portable computing device. For example, the computing device 104 may be a smartphone, a laptop, a desktop, a server. The sequence of images frames 106 may be acquired in any format and may be compressed and/or decompressed form. In addition, an object mask 112A corresponding to a first object 108A in a first image frame of the sequence of image frames 106 may be sent to the video object segmenting server 122. In addition, an object mask 112B corresponding to a second object 108B in a first image frame of the sequence of image frames 106 may be sent to the video object segmenting server 122.

In examples, the user 102 may generate each of the object masks 112A and 112B utilizing a video editing application for example. Alternatively, or in addition, a user 102 may generate each of the object masks 112A and 112B utilizing an image editing application, as each of the object masks 112A and 112B correspond to an object within a single image frame (e.g., first image frame) of video. The object masks 112A and 112B may utilize a first pixel value (e.g., 0,0,0) to indicate a pixel masking the object and a second pixel value (e.g., 255,255,255) to indicate a pixel that is not masking the object in the image.

The video object segmenting server 122 may receive the sequence of images frames 106 and the object masks 112A and/or 112B for a first image frame in the sequence of image frames 106; the video object segmenting server 122 may generate predicted object masks 120A and/or 120B corresponding to subsequent image frames in the sequence of image frames 106. For example, the video object segmenting server 122 may generate predicted object masks 120A and/or 120B corresponding to each object in each image frame in the sequence of image frames 106 that occurs subsequent in time to a first image frame of the sequence of image frames 106. In examples, the video object segmenting server 122 may generate predicted object masks 120A and/or 120B corresponding to each object in each image frame in the sequence of image frames 106 that occurs previous in time to another image frame of the sequence of image frames 106. The sequences of object masks 120A and/or 120B may then be provided to a computing device 104 of the requesting user 102.

Figure 2:
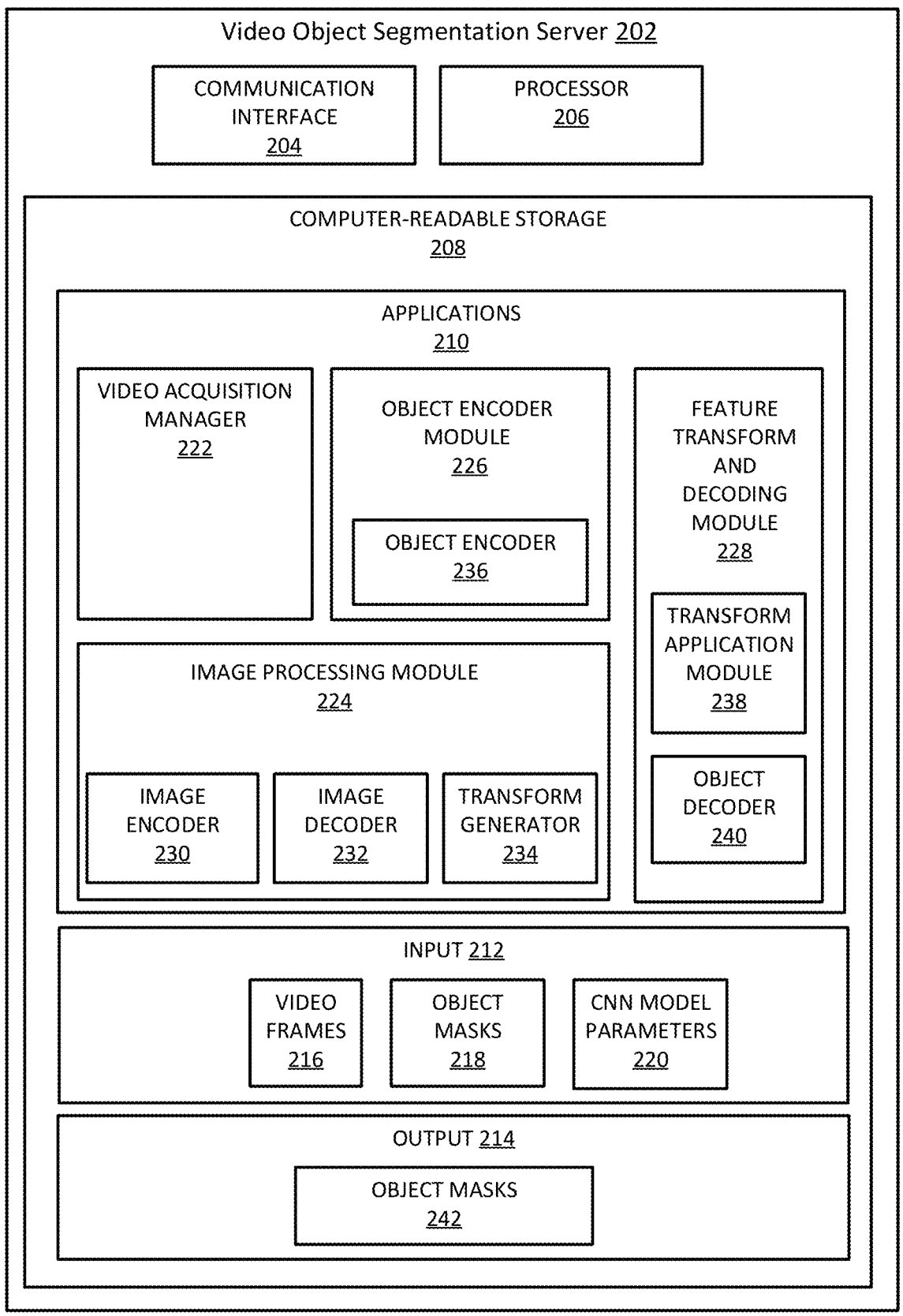
FIG. 2 depicts details of a video object segmenting server in accordance with examples of the present disclosure.

FIG. 2 depicts details of the video object segmentation server 202 in accordance with examples of the present disclosure. The video object segmentation server 202 may be the same as or similar to the video object segmenting server 122 previously described. The video object segmentation server 202 may include a communication interface 204, a processor 206, and a computer-readable storage 208. In examples, the communication interface 204 may be coupled to a network and receive the sequence of image frames 106 and the object masks 112A and/or 112B (FIG. 1).

The sequence of image frames 106 may be stored as video frames 216 and the object masks 112A and/or 112B may be stored as object masks 218. In some examples, one or more CNN model parameters may also be received at the communication interface 204 and stored as the CNN model parameters 220. The CNN model parameters 220 may include one or more parameters and hyperparameters that define a CNN model. In examples, the CNN model parameters 220 may correspond to a specific CNN implementation that is to be implemented at the video object segmentation server 202. For example, the CNN model parameters 220 may refer to a selection of a specific model (e.g., a specific model trained with a specific set of training data) that is made by a user. While the video frames 216, object masks 218, and CNN model parameters 220 are depicted as being input 212, other information and input may be received at the communication interface 204 and stored as input 212.

In examples, one or more applications 210 may be provided by the video object segmentation server 202. The one or more applications 210 may include a video acquisition manager 222, an image processing module 224, an object encoder module 226, and a feature transform and decoding module 228. The image processing module 224 may include an image encoder 230, an image decoder 232, and a transform generator 234. The object encoder module 226 may include an object encoder 236. The feature transform and decoding module 228 may include a transform application module 238 and an object decoder 240.

In contrast to STM-based methods that use separate image processing backbones, a single image feature extraction backbone may be utilized for mask prediction and temporal feature generation. Accordingly, the image processing backbone may be referred to as the image processing module 224. In examples, a convolutional neural network, such as Resnet-50, may be used to extract features from the image frames, where the image frames correspond to the sequence of image frames 106. Accordingly, an image encoder, such as the image encoder 230, may generate two pieces of information corresponding to the extracted features. The first piece of information may correspond to the image features used to generate transform matrices, and the second piece of information may correspond to features provided to the image decoder 232. The image decoder 232 may be a skip connected decoder, utilizing a single residual block and a plurality of refinement modules. It is worth noting that the image decoder 232 may not directly output predictions. Instead, the generated features of the image decoder 232 may be used in the feature transform and decoding module 228 to predict object masks. In this way, the intermediate features of the image processing module 224 may be reused for object specific computations, as will be described with respect to FIG. 4. The transform generator may generate transformation matrices based on neighboring image frames of the sequence of image frames.

To improve the efficiency of feature encoding for specific objects, the object masks may be encoded with a lightweight neural network, such as the object encoder 236, and reuse previously generated image features, instead of combining the object mask and image together to extract features. In accordance with examples of the present disclosure, the transform application module 238 may be a correlation-based feature transform to leverage the temporal information in the previous frames. In contrast to previous work that needs to re-compute the transform matrices for different target objects, the transform application module 238 computes the transform matrices once using only image features, which disentangles feature transforms from down-stream tasks. Accordingly, the feature transform can be viewed as a feature alignment function that targets finding correspondence of features across frames. Such correspondence is generally not related to any specific objects. Thus, the feature transform can be computed by the transform application module using the image and further applied to features encoded for specific objects. Similar to the object encoder module 226, the features from the image decoder 232 may be used by the object decoder 240. The object decoder 240 may generate predicted object masks based on the transformed features and the image decoded features from the image decoder 232.

Figure 3:
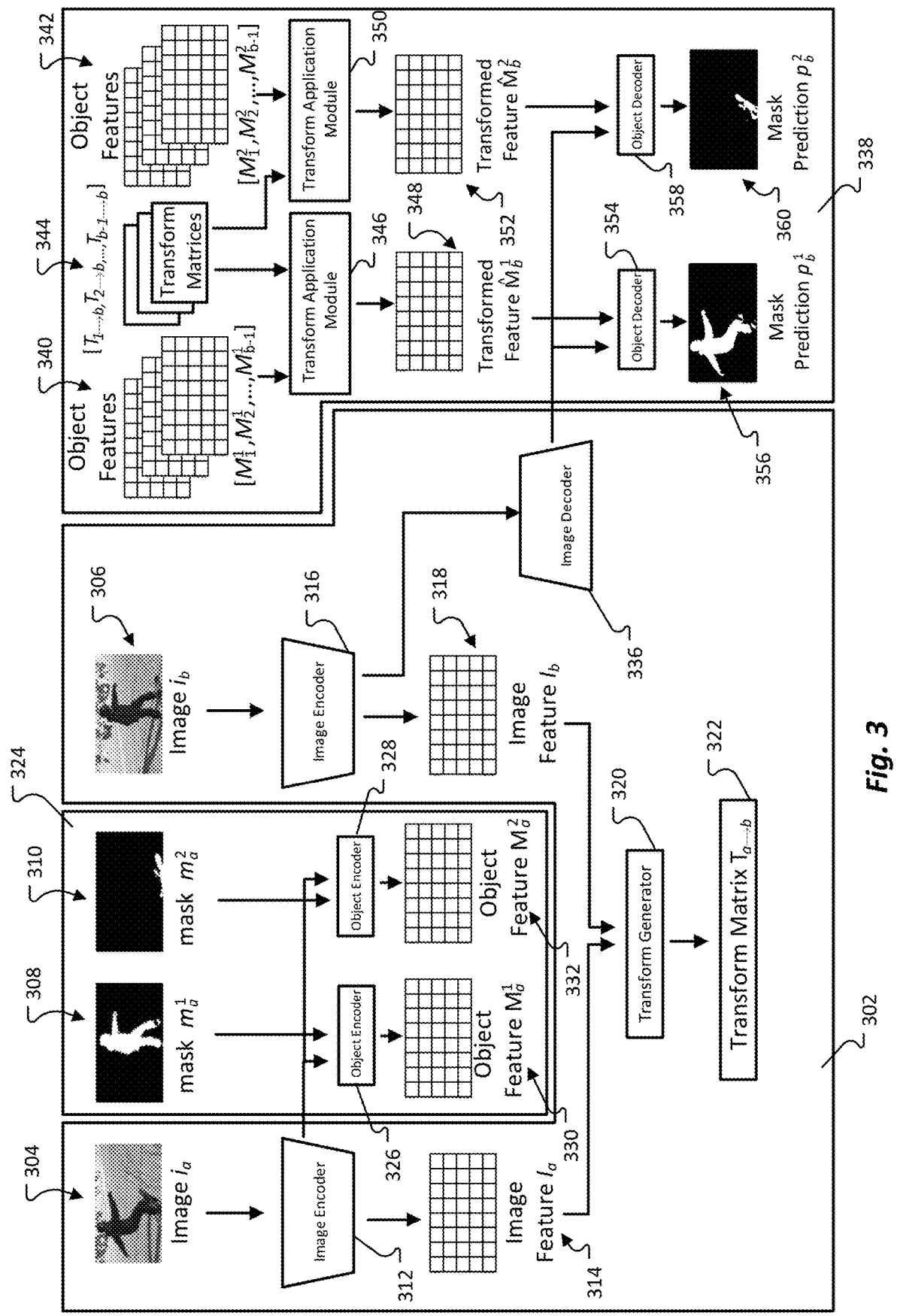
FIG. 3 depicts additional details of an image processing module, an object encoder module, and a feature transform and decoding module in accordance with examples of the present disclosure.

FIG. 3 depicts additional details of the image processing module 302, the object encoder module 324, and the feature transform and decoding module 338 in accordance with examples of the present disclosure. The image processing module 302 may be the same as or similar to the image processing module 224; the object encoder module 324 may be the same as or similar to the object encoder module 226; and the feature transform and decoding module 338 may be the same as or similar to the feature transform and decoding module 228. The image processing module 302 may receive a first image frame 304 of the sequence of image frames 106. An image encoder 312 may encode features of the first image frame 304 and generate image features 314. That is, the image encoder 312 may generate image features from the first image frame 304 rather than the image together with the object mask. Accordingly, the extracted features are not directed to any specific object in the sequence of image frames 106.

To predict object masks for each object of interest, object features may be generated from the respective object masks. For example, the object encoder 326, a network encoder that is smaller than the image encoder 312, may receive the object mask 308 and previously computed image features from the image encoder 312. The object encoder 326 may combine image features from the image encoder 312 together with the object mask 308 and generate object features 330. Similarly, for another object of interest, the object encoder 328, a network encoder that is smaller than the image encoder 312, may receive the second object mask 310 and previously computed image features from the image encoder 312. The object encoder 328 may combine image features from the image encoder 312 together with the object mask 310 and generate object features 332. More specifically, the features from the image encoder 312 can be combined with features of the masks ($m_a^1$ and $m_a^2$) using the respective light mask object encoders 326 and 328 to produce the mask features ($M_a^1$ and $M_a^2$).

When a new image frame, such as image frame 306, is received, the image features of the new frame may be used to generate a similarity transform matrix with the image features of previous frames. For example, the image encoder 316 may encode features of an image frame 306 and generate image features 318. Similar to the image encoder 312, the image encoder 316 may generate image features from the image frame 306 rather than the image together with the object mask. Accordingly, the extracted features are not relevant to any specific object in the sequence of image frames 106.

The transform generator 320 may receive the image features 314 and 318 and generate a similarity transform matrix 322. The similarity transform matrix 322 may be a matrix of weights indicating a similarity between the image features 318 and image features 314. The similarity transform matrix 322 may then be used to aggregate image features from previous frames and apply the aggregated image features to the objects. Where multiple objects are to be segmented, a common set of transform matrices 344 may be applied to the object features resulting in the transformed features. For example, the transform application module 346 may apply the set of transform matrices 344 to the object features 340 to obtain transformed object features 348, where the transformed object features 348 may be an aggregation of object features 340 from previous image frames. Similarly, the transform application module 350 may apply the set of transform matrices 344 to the object features 342 to obtain transformed object features 352, where the transformed object features 352 may be an aggregation of object features 342 from previous image frames. More specifically, the collected transform matrices ($[T_{1 \to b}, T_{2 \to b}, \ldots, T_{b-1 \to b}]$) generated from image features are applied to the corresponding mask features ($[M_1^1, M_2^1, \ldots M_{b-1}^1]$) and ($[M_1^2, M_2^2, \ldots M_{b-1}^2]$) to produce transformed features $\hat{M}_b^1$ and $\hat{M}_b^2$.

An image decoder 336 may be used to process image features from the image frame 306 and provide the processed image features to the object decoders 354 and 358. The image decoder 336 is not targeted to any specific object; the object decoders 354 and 358 are targeted to specific objects as indicated in the respective object masks 308 and 310. Accordingly, the predicted object mask prediction 356 may be generated by the object decoder 354 and the predicted object mask prediction 360 may be generated by the object decoder 358. More specifically, the object decoders 354 and 358 combine the transformed features with shared features from the image decoder 336 to output predictions ($p_b^1$ and $p_b^2$). Leveraging the global image features, this pipeline efficiently processes each object with a reduced computation cost, as a single pass of encoding for each image is needed, which generates features for both mask prediction and temporal feature encoding. Thus, the proposed processing pipeline accelerates semi-supervised VOS for both single-object and multi-object cases.

Figure 4:
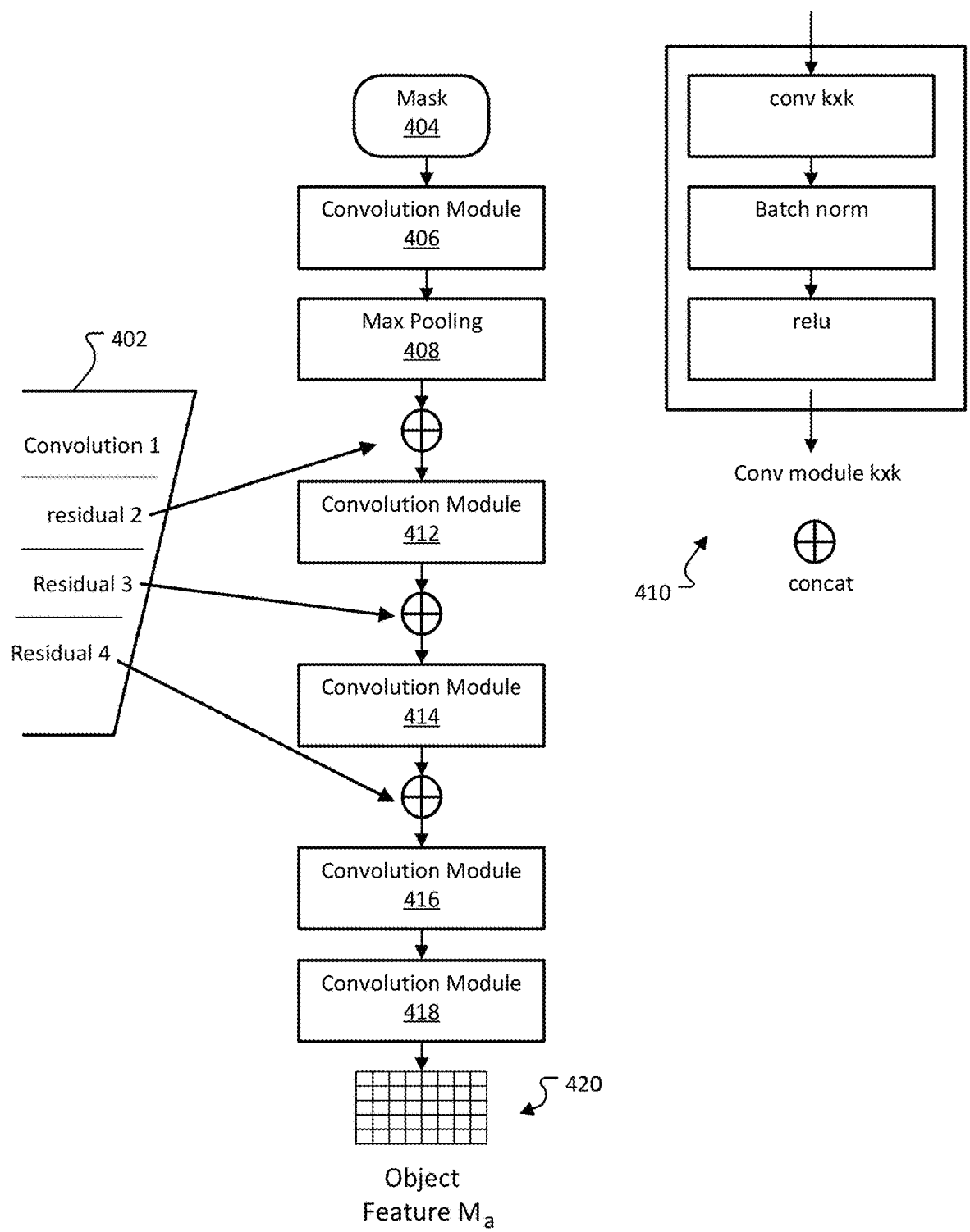
FIG. 4 depicts details of an object encoder in accordance with examples of the present disclosure.

FIG. 4 depicts details of an object encoder module 402 in accordance with examples of the present disclosure. The object encoder module 402 may be the same as or similar to the object encoders 326 and 328 (FIG. 3) previously discussed. The object encoder module 402 may include five convolutional layers 406, 412, 414, 416, and 418. An object mask 404 represented with a single channel probability map between 0 and 1 is first down-sampled with lightweight convolution 406 and pooling layers 408. Then, at the residual blocks (e.g., residual 1, residual 2, residual 3) the mask features are concatenated with features from the last convolution layer of each stage in the object encoder. As depicted by reference character 410, the residual blocks may include a convolutional layer, batch normalization layer, and a rectified linear unit. After each concatenation, the features are down-sampled with strided convolution layers (e.g., stride=2) to ensure a dimensional fit with the next concatenation. Afterwards, two additional convolution layers 416 and 418 are used to process the features to generate object features $M_a$. A 3×3 kernel may be used for the convolution layer to out-put 256 channels and to ensure the appropriate receptive field. When the channel number becomes larger, a 1×1 kernel may be used to improve efficiency. Compared to the memory encoder of STM employing fifty convolution layers to incorporate masks, the proposed architecture only adopts five convolution layers, which ensures the efficiency of the proposed object specific feature encoding strategy.

As previously discussed, a correlation-based feature transform is employed to leverage the temporal information in the previous frames. In contrast to previous work that re-computes the transform matrices for different target objects, examples of the present disclosure compute the transform matrices once using only image features, which disentangles the feature transform from down-stream tasks. Thus, the feature transform can be viewed as a feature alignment function which targets finding correspondence of features across frames. Such correspondence is not related to any specific objects. Thus, the feature transform can be computed using the image and further applied to features encoded for specific objects. Compared to STM, the image features $I_a$ 314 (shown in FIG. 3) and object features $M_a$ may be employed as key and value, respectively. Formally, the transformed feature can be expressed as:

$$\hat{M}_b = \sum_{\forall a<b} \frac{1}{z} \exp(T_{a\to b}) \circ M_a$$

where ∘ denotes matrix multiplication, and $T_{a\to b}$ represents the feature transform matrix from frame a to frame b. Z is a normalization factor formalized as $Z=\Sigma_{\forall a<b} \exp(T_{a\to b})$. $T_{a\to b}$ is formulated by pixel-wise correlation between image features $I_a$ and $I_b$, i.e., $$T_{a\to b}=f(I_b)\cdot f(I_b)^T$$

Where f is a function to flatten the image features along spatial axes. The term $$\frac{1}{z}\exp(T_{a\to b})$$

is object-agnostic and can be shared among different objects.

Figure 5:
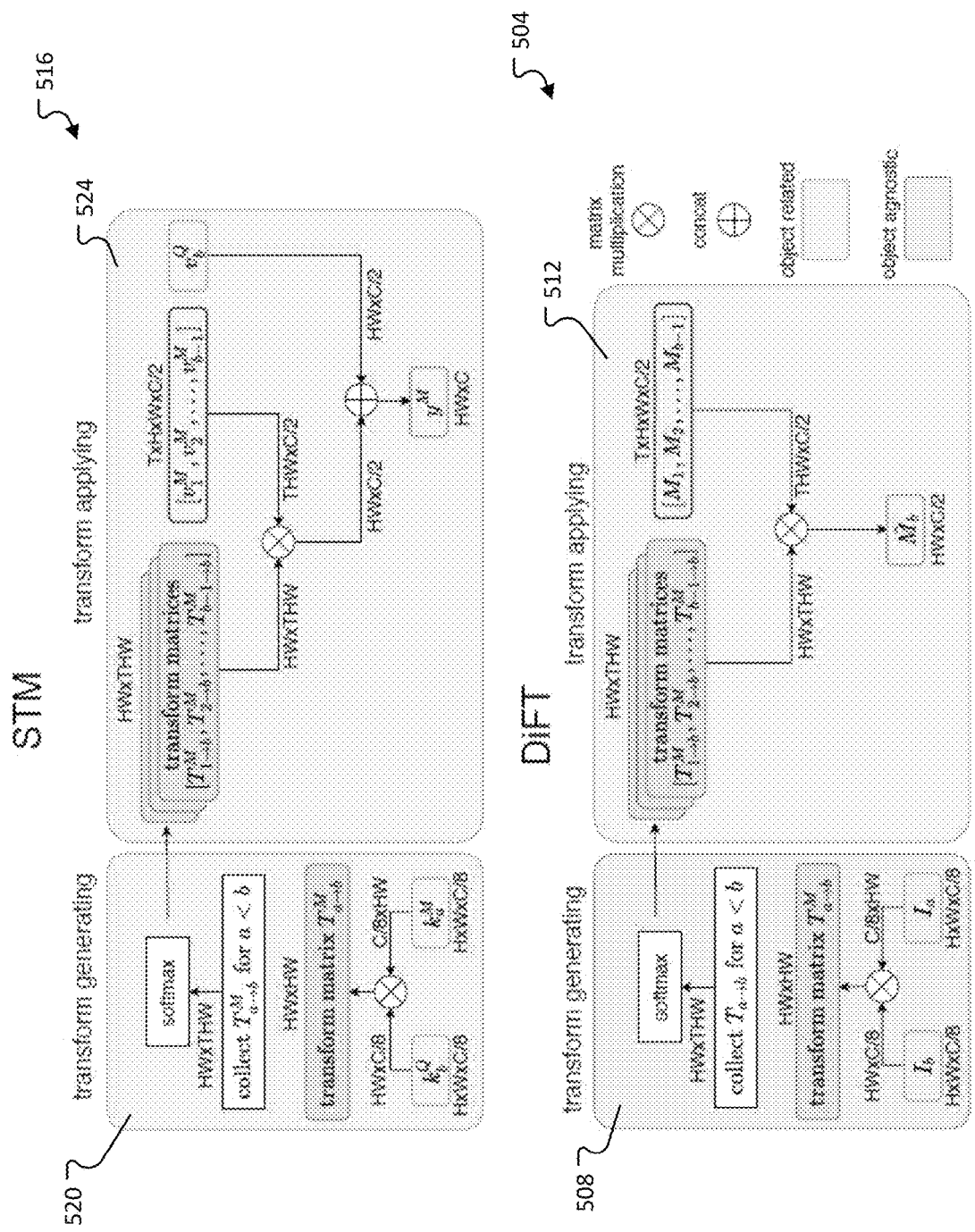
FIG. 5 depicts details of feature transform workflows in accordance with examples of the present disclosure.

FIG. 5 depicts a comparison between the DiFT network described herein and an STM network. The DiFT depicted in FIG. 5, separates a processing framework into two major portions to achieve significant performance increases in execution speed. First, an image processing backbone generates both multi-scale image features and cross-frame feature transforms. Second, the DiFT network may include an object specific portion to incorporate object masks. The DiFT may reuse processed image features and correlation maps for feature transforms among different object masks, boosting the processing speed for multiple-object scenarios. In addition, multi-scale image features can be reused to generate object specific features using a lightweight network to fuse mask features and image features.

While both feature transform workflows 504 and 516 utilize a two-stage design that includes a transform generating stage 508/520 and a transform applying stage 512/524, the transform generating stage 520 of the STM generates different transform matrices for different objects. That is, to predict an object mask for each object in an STM, an object specific transform matrix is generated. The STM therefore, does not reuse processed image features and correlation maps for feature transforms among different object masks. Accordingly, increasing the number of objects that are segmented by the STM proportionally increases the number of transform matrices that are created. In contrast to the STM, the transform generating stage 508 of the DiFT network uses the unified transform matrices for different objects (e.g., the transform matrix 322 is object agnostic). Accordingly, increasing the number of objects that are segmented in the DiFT does not increase the number of transform matrices that are generated.

Such an approach contributes to an efficiency of the feature transform workflow 504 over the feature transform workflow 516 in multi-object video segmentation scenarios.

Figure 6:
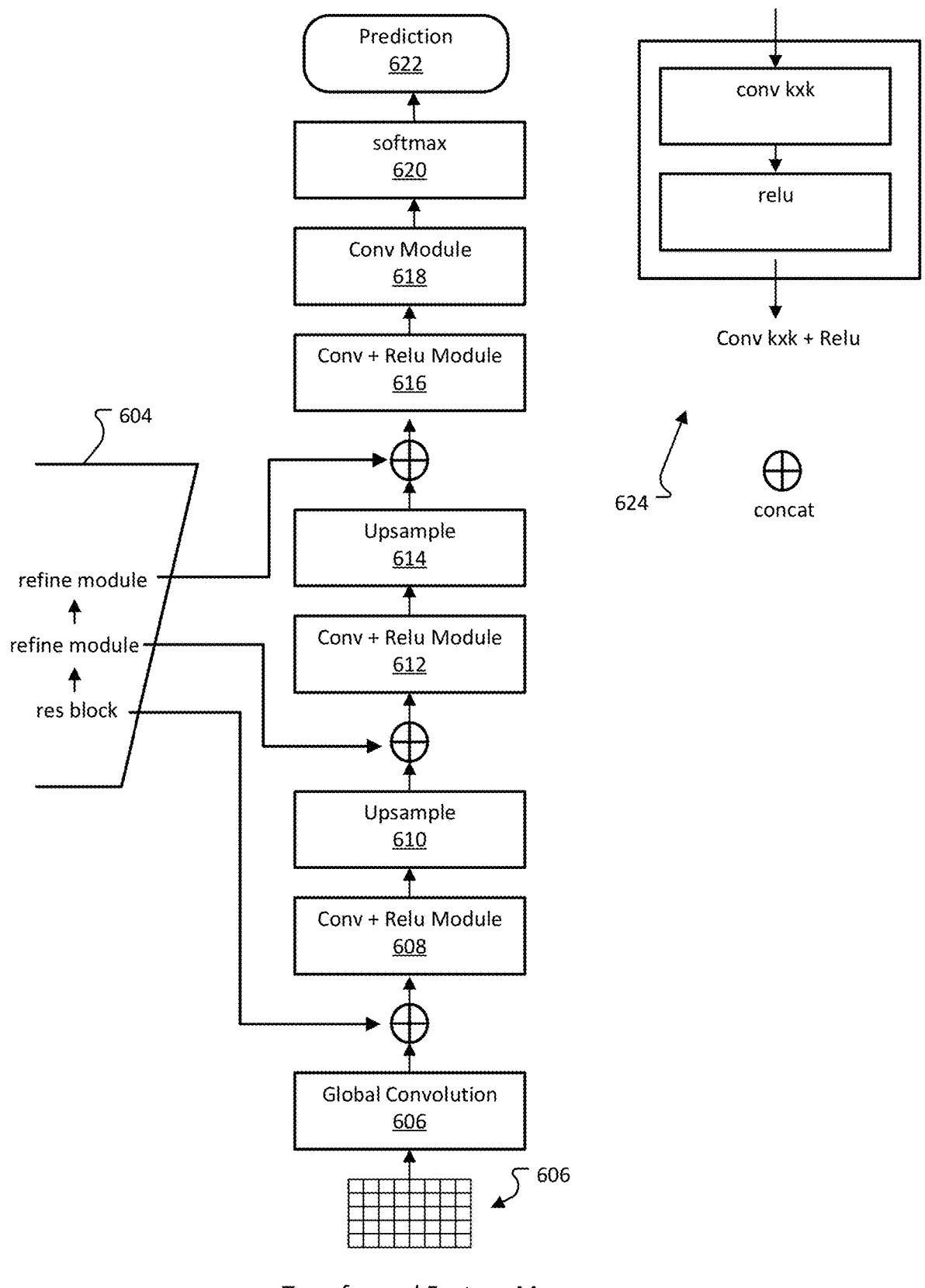
FIG. 6 depicts details of an object encoder in accordance with examples of the present disclosure.

FIG. 6 depicts details of an object decoder in accordance with examples of the present disclosure. The object decoder module 604 may be the same as or similar to the object decoders 354/358 as previously described and may include a plurality of refinement modules and one or more residual networks. Similar to the object encoder module 402, features from the image decoder (e.g., 336 of FIG. 3) are used to reduce the network for the object decoder module 604, as depicted in FIG. 6. The input to the object decoder module 604 is the transformed feature $\hat{M}_b$, which is first processed by a global convolution module 606 to efficiently enlarge the receptive field. Following the global convolution module 606, the features are gradually merged with the image decoding features using a concatenation layer 624 and a convolution layers 608, 612, and 616 having 3×3 kernels for example. The decoded features are up sampled at 610 and 614 in accordance with size of features from image decoder. After merging with the image features of reduced resolution of the original image, the features are sent to an additional convolutional 618 layer followed by a softmax layer 620 to generate the final predictions 622. By re-using the image decoding features in the object decoder module 604, the large amount of computational costs for predicting masks can be reduced for a same video sequence with multiple objects.

In examples, the disentangled feature transform (DiFT) network as described herein, may be trained using a two-step approach. First, the disentangled feature transform (DiFT) network may be pre-trained on a simulated data set generated from static images. The disentangled feature transform (DiFT) network may then be trained on a target video dataset. Since the disentangled feature transform (DiFT) network handles multi-object scenarios, the multi-objects videos are used for both pre-training and main-training.

Figure 7:
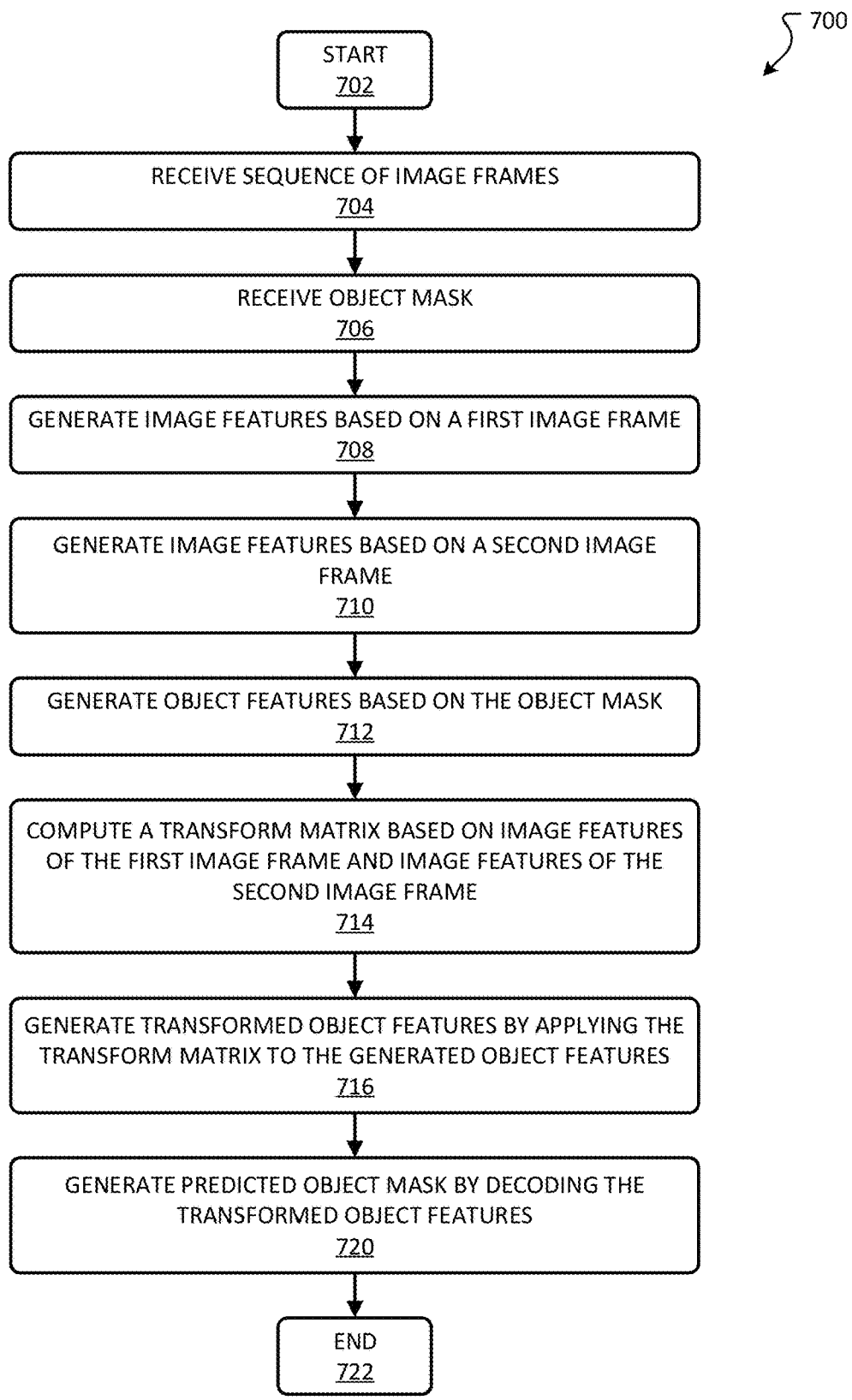
FIG. 7 depicts details of a method for generating a predicted object mask in accordance with examples of the present disclosure.

FIG. 7 depicts details of a method 700 for generating a predicted object mask in accordance with examples of the present disclosure. A general order for the steps of the method 700 is shown in FIG. 7. Generally, the method 700 starts at 702 and ends at 722. The method 700 may include more or fewer steps or may arrange the order of the steps differently than those shown in FIG. 7. The method 700 can be executed as a set of computer-executable instructions executed by a computer system and encoded or stored on a computer readable medium. In examples, aspects of the method 700 are performed by one or more processing devices, such as a computer or server. Further, the method 700 can be performed by gates or circuits associated with a processor, Application Specific Integrated Circuit (ASIC), a field programmable gate array (FPGA), a system on chip (SOC), a neural processing unit, or other hardware device. Hereinafter, the method 700 shall be explained with reference to the systems, components, modules, software, data structures, user interfaces, etc. described in conjunction with FIGS. 1-6.

The method starts at 702, where flow may proceed to 704. At 704, a sequence of image frames, such as sequence of image frames 106 may be received. In examples, the sequence of image frames may be received at the video acquisition manager 222 (FIG. 2) for example. The method may proceed to 706, where an object mask is received. In examples, the object mask may be the same as or similar to the object mask 308 (FIG. 3). The object mask may mask an object that is to be segmented from the background of the video or otherwise segmented from the sequence of image frames. In examples, the object mask corresponds to a first image frame in the sequence of image frames. In other examples, the object mask corresponds to an image frame other than the first image frame in the sequence of image frames.

The method 700 may proceed to 708, where image features based on a first image frame of the sequence of image frames are generated. The image features may be generated by an encoder, such as the image encoder 312 (FIG. 3). The method 700 may proceed to 710, where image features based on a second image frame of the sequence of image frames are generated. The image features may be generated by an encoder, such as the image encoder 316 (FIG. 3). In examples, the first image frame may correspond to an image frame associated with the received object mask. The method may proceed to 712, where object features are generated based on the received object mask and image features associated with the first image frame. For example, an object encoder 326 (FIG. 3) may generate object features based on the object mask 308 and image features generated by the image encoder 312.

The method 700 may proceed to 714, where a transform matrix is computed based on the image features of the first image frame and the image features of the second image frame. In examples, the transform matrix may be a similarity matrix indicating a similarity between pixels of a first and second frame and/or between image features associated with the first and second frame. The method may proceed to 716, where transformed object features are generated by applying the transform matrix to the generated objected features. At 720, an object decoder may generate a predicted object mask for an image frame, such as the second image frame, based on the transformed object features and decoded image features associated with the second image frame. For example, an object decoder 354 may receive features from the image decoder 336 (FIG. 3) and receive the transformed object features 348 (FIG. 3). The object decoder 354 may generate the object mask prediction 356 and provide the object mask prediction 356 alone, or as part of a mask prediction sequence, to a computing device of a requesting user. The method 700 may end at 722.

Figure 8:
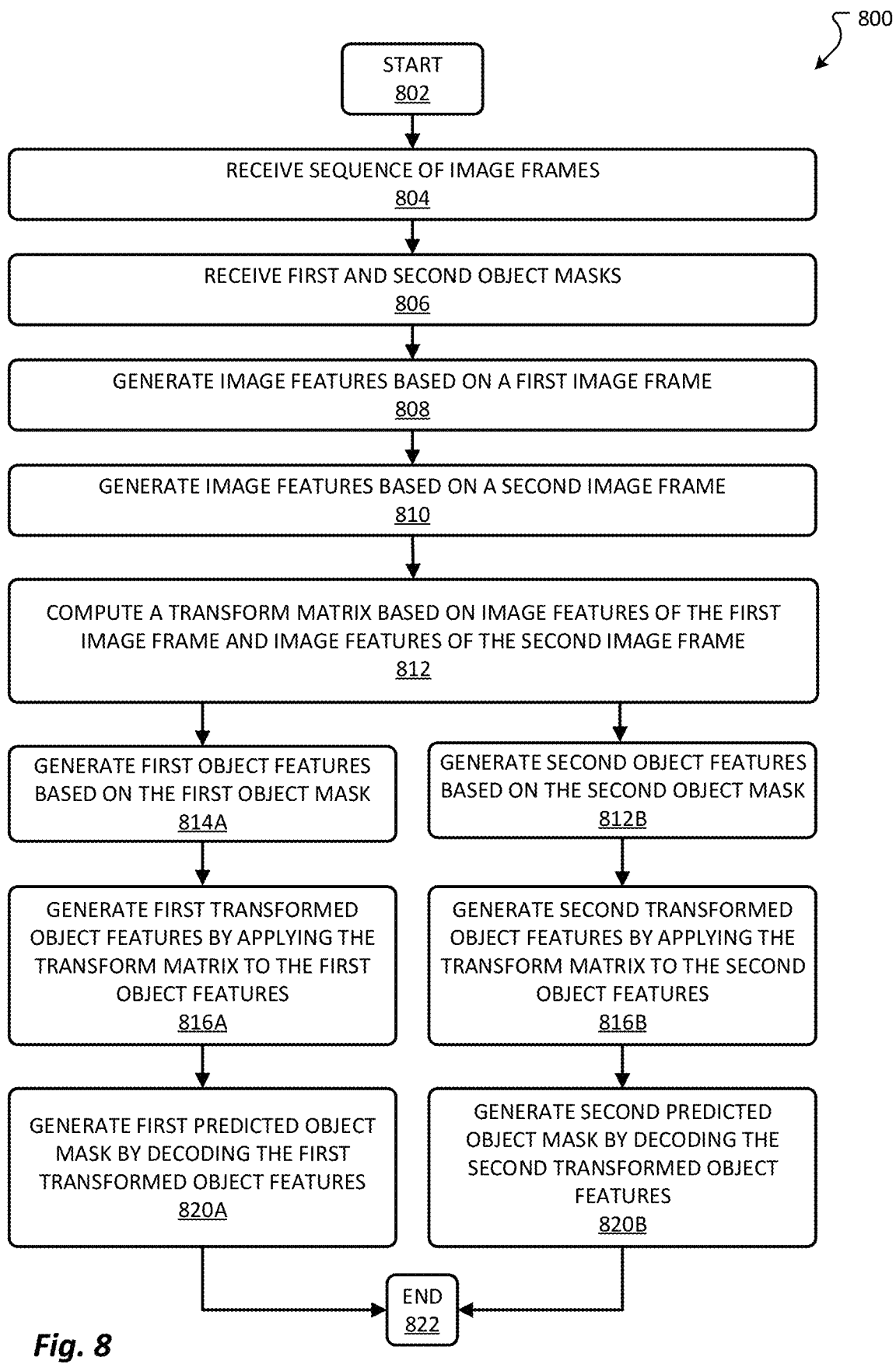
FIG. 8 depicts details of a method for generating a plurality of predicted object masks in accordance with examples of the present disclosure.

FIG. 8 depicts details of a method 800 for generating a plurality of predicted object masks in accordance with examples of the present disclosure. A general order for the steps of the method 800 is shown in FIG. 8. Generally, the method 800 starts at 802 and ends at 822. The method 800 may include more or fewer steps or may arrange the order of the steps differently than those shown in FIG. 8. The method 800 can be executed as a set of computer-executable instructions executed by a computer system and encoded or stored on a computer readable medium. In examples, aspects of the method 800 are performed by one or more processing devices, such as a computer or server. Further, the method 800 can be performed by gates or circuits associated with a processor, Application Specific Integrated Circuit (ASIC), a field programmable gate array (FPGA), a system on chip (SOC), a neural processing unit, or other hardware device. Hereinafter, the method 700 shall be explained with reference to the systems, components, modules, software, data structures, user interfaces, etc. described in conjunction with FIGS. 1-7.

The method starts at 802, where flow may proceed to 804. At 804, a sequence of image frames, such as sequence of image frames 106 may be received. In examples, the sequence of image frames may be received at the video acquisition manager 222 (FIG. 2) for example. The method may proceed to 806, where first and second object masks are received. In examples, the object masks may be the same as or similar to the object masks 308 and 310 (FIG. 3). The object masks may mask different objects that are to be segmented from the background of the video or otherwise segmented from the sequence of image frames. In examples, the object masks correspond to a first image frame in the sequence of image frames. In other examples, the object masks correspond to an image frame other than the first image frame in the sequence of image frames.

The method 800 may proceed to 808, where image features based on a first image frame of the sequence of image frames are generated. The image features may be generated by an encoder, such as the image encoder 312 (FIG. 3). The method 800 may proceed to 810, where image features based on a second image frame of the sequence of image frames are generated. The image features may be generated by an encoder, such as the image encoder 316 (FIG. 3). In examples, the first image frame may correspond to an image frame associated with the received object masks. The method may proceed to 812, where a transform matrix is computed based on the image features of the first image frame and the image features of the second image frame. In examples, the transform matrix may be a similarity matrix indicating a similarity between pixels of a first and second frame and/or between image features associated with the first and second frame.

The method 800 may proceed 814A, where first object features are generated based on the received first object mask and image features associated with the first image frame. For example, an object encoder 326 (FIG. 3) may generate first object features based on the first object mask 308 and image features generated by the image encoder 312. In addition, the method 800 may generate second object features based on the received second object mask and image features associated with the first image frame. For example, an object encoder 328 (FIG. 3) may generate second object features based on the second object mask 310 and image features generated by the image encoder 316.

The method 800 may proceed to 816A and 816B, where transformed object features are generated by applying the transform matrix to the generated objected features. At 816A, first transformed object features are generated by applying the transform matrix to the generated first object features. At 816B, second transformed object features are generated by applying the transform matrix to the generated second object features. The method may proceed to 820A and 820B where a predicted object mask for an image frame, such as the second image frame, based on the second transformed object features and decoded image features associated with the second image frame are generated. For example, at 820A, an object decoder 354 may receive features from the image decoder 336 (FIG. 3) and receive the first transformed object features 348 (FIG. 3). The object decoder 354 may generate the first object mask prediction 356 and provide the first object mask prediction 356 alone, or as part of a mask prediction sequence, to a computing device of a requesting user. At 820B, an object decoder 358 may receive features from the image decoder 336 (FIG. 3) and receive the second transformed object features 352 (FIG. 3). The object decoder 358 may generate the second mask prediction 360 and provide the second mask prediction 360 alone, or as part of a mask prediction sequence, to a computing device of a requesting user. Accordingly, the object encoders and object decoders are specific to a received mask. The method 800 may end at 822. Advantageously, by re-using the image decoding features in the object decoder, the computational cost for predicting masks in the video sequences with multiple objects is greatly reduced.

Figure 9:
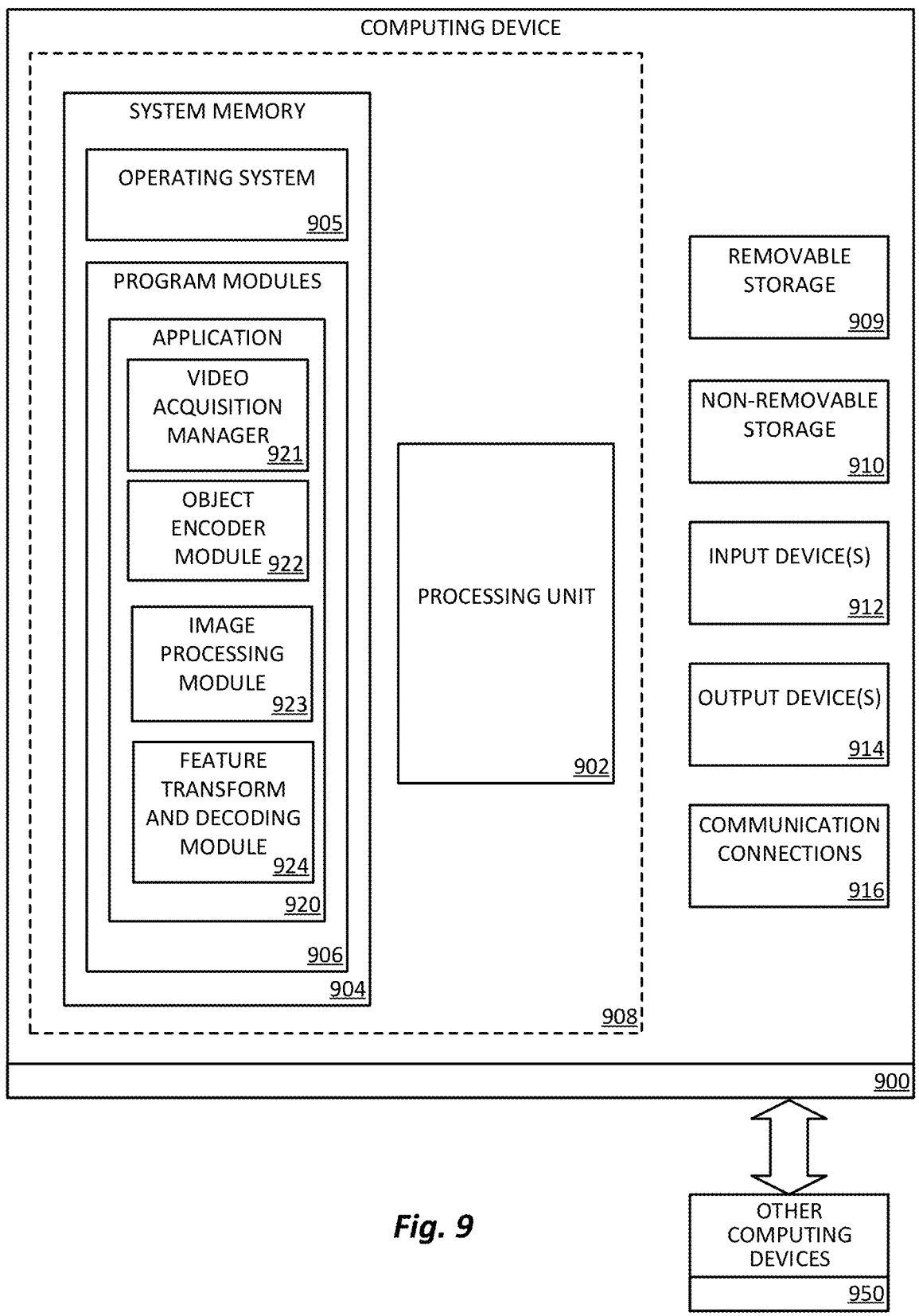
FIG. 9 is a block diagram illustrating physical components (e.g., hardware) of a computing device with which aspects of the disclosure may be practiced.
Figure 10A:
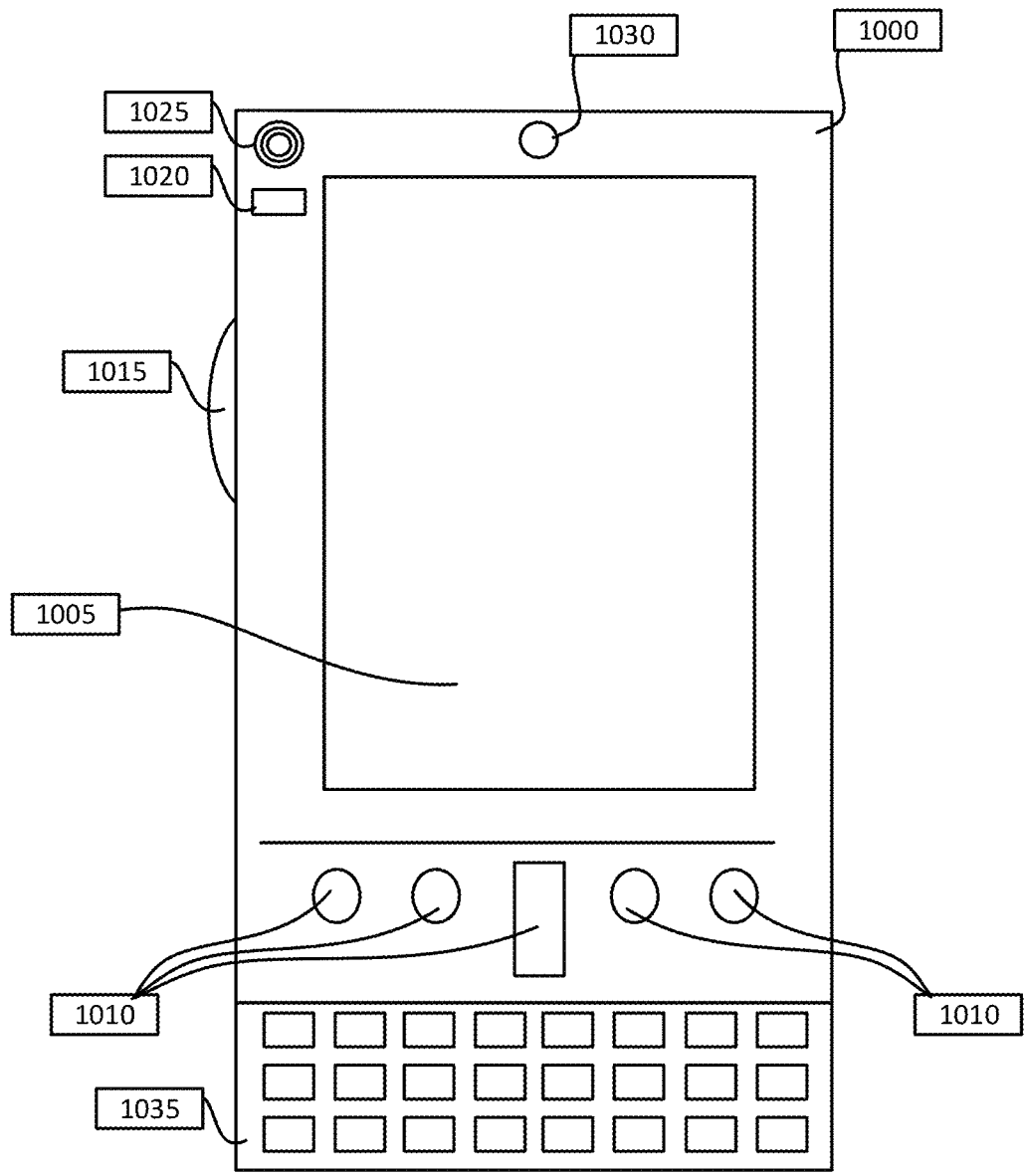
FIGS. 10A-10B illustrate a mobile computing device with which embodiments of the disclosure may be practiced.
Figure 10B:
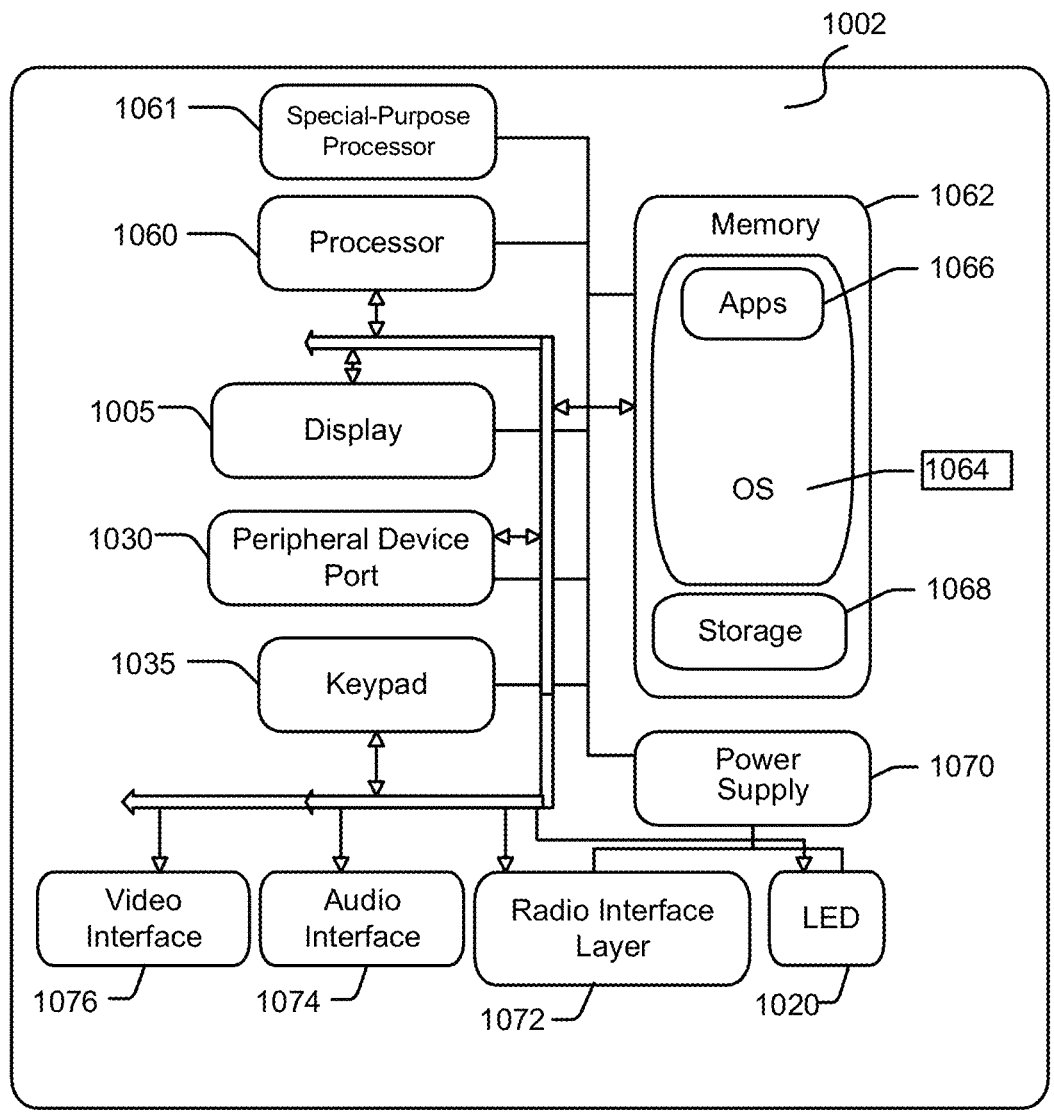
Figure 11:
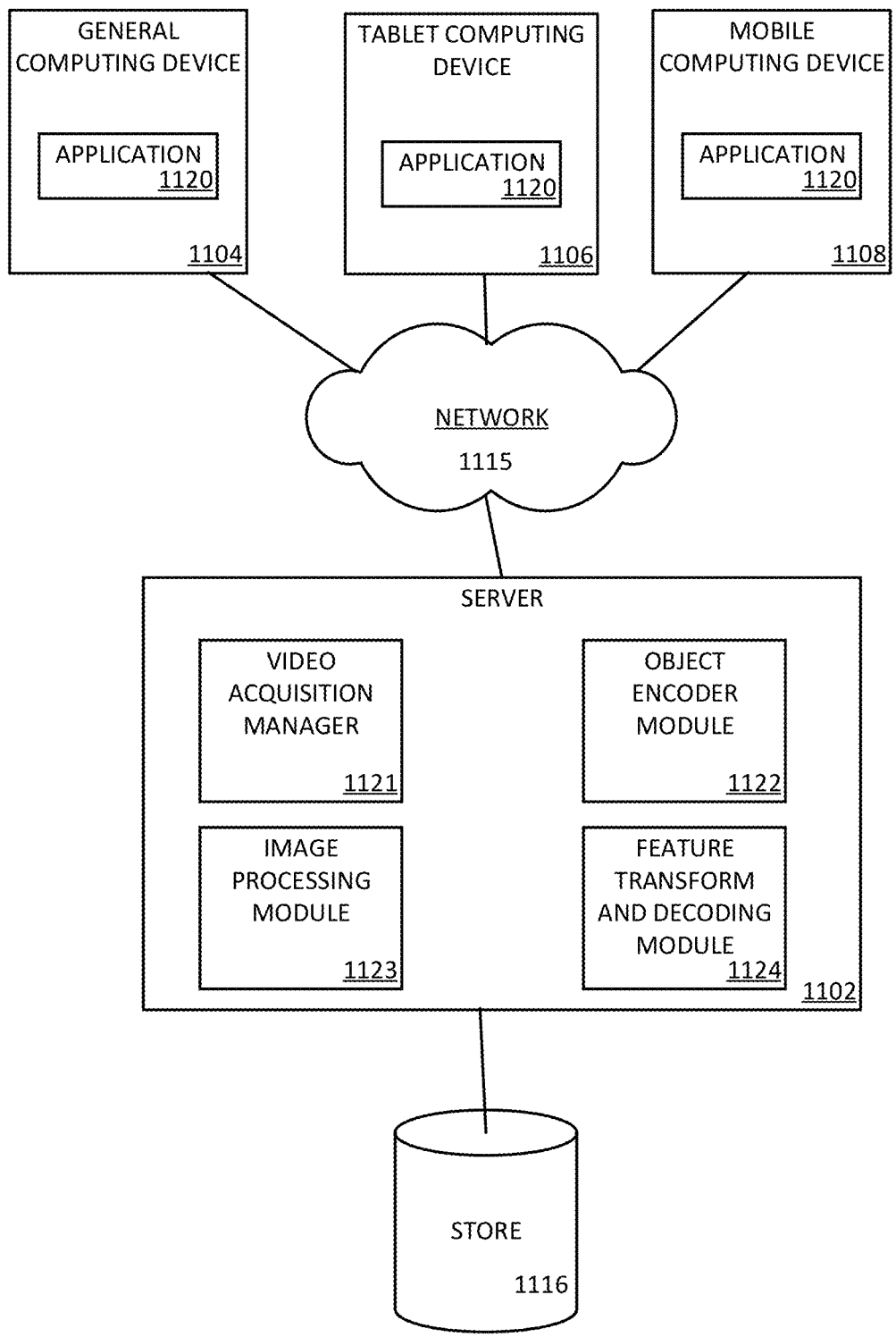
FIG. 11 illustrates one aspect of the architecture of a system for processing data.

FIGS. 9-11 and the associated descriptions provide a discussion of a variety of operating environments in which aspects of the disclosure may be practiced. However, the devices and systems illustrated and discussed with respect to FIGS. 9-11 are for purposes of example and illustration and are not limiting of a vast number of computing device configurations that may be utilized for practicing aspects of the disclosure, described herein.

FIG. 9 is a block diagram illustrating physical components (e.g., hardware) of a computing system 900 with which aspects of the disclosure may be practiced. The computing device components described below may be suitable for the computing and/or processing devices described above. In a basic configuration, the computing system 900 may include at least one processing unit 902 and a system memory 904. Depending on the configuration and type of computing device, the system memory 904 may comprise, but is not limited to, volatile storage (e.g., random-access memory (RAM)), non-volatile storage (e.g., read-only memory (ROM)), flash memory, or any combination of such memories.

The system memory 904 may include an operating system 905 and one or more program modules 906 suitable for running software application 920, such as one or more components supported by the systems described herein. As examples, system memory 904 may include the video acquisition manager 921, the object encoder module 922, the image processing module 923, and the feature transform and decoding module 924. The video acquisition manager 921 may be the same as or similar to the video acquisition manager 222 previously described. The object encoder module 922 may be the same as or similar to the object encoder module 226 previously described. The image processing module 923 may be the same as or similar to image processing module 224 previously described. The feature transform and decoding module 924 may be same as or similar to the feature transform and decoding module 228 previously described. The operating system 905, for example, may be suitable for controlling the operation of the computing system 900.

Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing system 900 may have additional features or functionality. For example, the computing system 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., software applications 920) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, embodiments of the disclosure may be practiced in an electrical circuit discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computing system 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing system 900 may also have one or more input device(s) 912 such as a keyboard, a mouse, a pen, a sound or voice input device, a touch or swipe input device, etc. The one or more input device 912 may include an image sensor. The output device(s) 914 such as a display, speakers, a printer, etc. may also be included. The aforementioned devices are examples and others may be used. The computing system 900 may include one or more communication connections 916 allowing communications with other computing devices/systems 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing system 900. Any such computer storage media may be part of the computing system 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 10A-10B illustrate a mobile computing device 1000, for example, a mobile telephone, a smart phone, wearable computer (such as a smart watch), a tablet computer, a laptop computer, and the like, with which embodiments of the disclosure may be practiced. In some examples, the mobile computing device 1000 may be the same as or similar to the computing device 104. In some examples, the mobile computing device 1000 may be the same as or similar to the video object segmentation server 202. In some respects, the client may be a mobile computing device. With reference to FIG. 10A, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display).

If included, an optional side input element 1015 allows further user input. The side input element 1015 may be a rotary switch, a button, or any other type of manual input element. In alternative aspects, mobile computing device 1000 may incorporate greater or fewer input elements. For example, the display 1005 may not be a touch screen in some embodiments.

In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display.

In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, maps programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000 described herein (e.g., the video acquisition manager 921, the object encoder module 922, the image processing module 923, and the feature transform and decoding module 924, etc.).

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 may be used to provide visual notifications, and/or an audio interface 1074 may be used for producing audible notifications via the audio transducer 1025. In the illustrated embodiment, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an on-board camera 1030 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 3068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

FIG. 11 illustrates one aspect of the architecture of a system for processing data received at a computing system from a remote source, such as a personal computer 1104, tablet computing device 1106, or mobile computing device 1108, as described above. The personal computer 1104, tablet computing device 1106, or mobile computing device 1108 may include one or more applications 1120; such applications may include but are not limited to the video acquisition manager, the object encoder module, the image processing module, and the feature transform and decoding module. Content at a server device 1102 may be stored in different communication channels or other storage types. For example, various documents may be stored using a directory service, a web portal, a video inpainting service, an instant messaging store, or social networking services.

One or more of the previously described program modules 906 or software applications 920 may be employed by server device 1102 and/or the personal computer 1104, tablet computing device 1106, or mobile computing device 1108, as described above. For example, the server device 1102 may include the video acquisition manager 1121, the object encoder module 1122, the image processing module 1123, and the feature transform and decoding module 1124. The video acquisition manager 1121 may be the same as or similar to the video acquisition manager 222 previously described. The object encoder module 1122 may be the same as or similar to the object encoder module 226 previously described. The image processing module 1123 may be the same as or similar to image processing module 224 previously described. The feature transform and decoding module 1124 may be same as or similar to the feature transform and decoding module 228 previously described.

The server device 1102 may provide data to and from a client computing device such as a personal computer 1104, a tablet computing device 1106 and/or a mobile computing device 1108 (e.g., a smart phone) through a network 1115. By way of example, the computer system described above may be embodied in a personal computer 1104, a tablet computing device 1106 and/or a mobile computing device 1108 (e.g., a smart phone). Any of these embodiments of the computing devices may obtain content from the store 1116, in addition to receiving graphical data useable to be either pre-processed at a graphic-originating system, or post-processed at a receiving computing system.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The present disclosure relates to systems and methods for performing video object segmentation according to at least the examples provided in the sections below:

(A1) In one aspect, some examples include a method for performing video object segmentation. The method may include receiving video data representing a sequence of image frames, receiving an object mask, generating image features based on a first image frame of the sequence of image frames, generating object features based on the object mask, generating image features based on a second image frame of the sequence of image frames, computing a transform matrix based on the image features of the first image frame and the image features of the second image frame, applying the transform matrix to the object features resulting in transformed object features, and obtaining a predicted object mask associated with the second image frame by decoding the transformed object features.

(A2) In some examples of A1, the method includes receiving a second object mask, generating second object features based on the second object mask, applying the transform matrix to the second object features based on the second object mask resulting in second transformed object features, and obtaining a second predicted object mask associated with the second image frame by decoding the second transformed object features.

(A3) In some examples of A1-A2, the object features are generated based on the object mask and the image features based on the first image frame, and the second object features are generated based on the second object mask and the image features based on the first image frame.

(A4) In some examples of A1-A3, the predicted object mask associated with the second image frame is based on the transformed object features and decoded object features associated with the second image frame, and the second predicted object mask associated with the second image frame is based on the second transformed object features and the decoded object features associated with the second image frame.

(A5) In some examples of A1-A4, the method includes obtaining the predicted object mask associated with the second image frame by decoding the transformed object features at a decoder that is different than a decoder that decodes the object features associated with the second image frame.

(A6) In some examples of A1-A5, the method includes generating the image features based on the first image frame of the sequence of image frames at an encoder that is different than an encoder that generates the object features based on the object mask.

(A7) In some examples of A1-6, the transformation matrix includes similarity information indicating a similarity between the first image frame and the second image frame.

In yet another aspect, some examples include a computing system including one or more processors and memory coupled to the one or more processors, the memory storing instructions configured to be executed by the one or more processors, the instructions when executed by the on or more processors, perform any of the methods described herein (e.g., A1-A7 described above).

In yet another aspect, some examples include a non-transitory computer-readable storage medium storing one or more programs for execution by one or more processors of a storage device, the one or more programs including instructions for performing any of the methods described herein (e.g., A1-A7 described above).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for performing video object segmentation, the method comprising:
    receiving video data representing a sequence of image frames;
    receiving an object mask;
    generating image features based on a first image frame of the sequence of image frames;
    generating object features based on the object mask;
    generating image features based on a second image frame of the sequence of image frames;
    computing a transform matrix based on the image features of the first image frame and the image features of the second image frame;
    applying the transform matrix to the object features resulting in transformed object features; and
    obtaining a predicted object mask associated with the second image frame by decoding the transformed object features.

2. The method of claim 1, wherein the predicted object mask associated with the second image frame is obtained based on the transformed object features and decoded image features associated with the second image frame.

3. The method of claim 1, further comprising:
    receiving a second object mask;
    generating second object features based on the second object mask;
    applying the transform matrix to the second object features based on the second object mask resulting in second transformed object features; and
    obtaining a second predicted object mask associated with the second image frame by decoding the second transformed object features.

4. The method of claim 3, wherein the object features are generated based on the object mask and the image features based on the first image frame and the second object features are generated based on the second object mask and the image features based on the first image frame.

5. The method of claim 4, wherein the predicted object mask associated with the second image frame is based on the transformed object features and decoded image features associated with the second image frame, and wherein the second predicted object mask associated with the second image frame is based on the second transformed object features and the decoded image features associated with the second image frame.

6. The method of claim 5 further comprising obtaining the predicted object mask associated with the second image frame by decoding the transformed object features at a decoder that is different than a decoder that decodes the object features associated with the second image frame.

7. The method of claim 1, further comprising:
    generating the image features based on the first image frame of the sequence of image frames at an encoder that is different than an encoder that generates the object features based on the object mask.

8. A system configured to perform video object segmentation, the system comprising:
    a processor; and
    memory including instructions, which when executed by the processor, causes the processor to:
        receive video data representing a sequence of image frames;
        receive an object mask;
        generate image features based on a first image frame of the sequence of image frames;
        generate object features based on the object mask;
        generate image features based on a second image frame of the sequence of image frames;
        compute a transform matrix based on the image features of the first image frame and the image features of the second image frame;
        apply the transform matrix to the object features resulting in transformed object features; and
        obtain a predicted object mask associated with the second image frame by decoding the transformed object features.

9. The system of claim 8, wherein the instructions, when executed by the processor, cause the processor to:
    receive a second object mask;
    generate second object features based on the second object mask;
    apply the transform matrix to the second object features based on the second object mask resulting in second transformed object features; and
    obtain a second predicted object mask associated with the second image frame by decoding the second transformed object features.

10. The system of claim 9, wherein the object features are generated based on the object mask and image features of the first image frame and the second object features are generated based on the second object mask and the image features of the first image frame.

11. The system of claim 10, wherein the predicted object mask associated with the second image frame is based on the transformed object features and decoded image features associated with the second image frame, and wherein the second predicted object mask associated with the second image frame is based on the second transformed object features and the decoded image features associated with the second image frame.

12. The system of claim 11, wherein the instructions, when executed by the processor, cause the processor to obtain the predicted object mask associated with the second image frame by decoding the transformed object features at a decoder that is different than a decoder that decodes the object features associated with the second image frame.

13. The system of claim 8, wherein the instructions, when executed by the processor, cause the processor to generate the image features based on the first image frame of the sequence of image frames at an encoder that is different than an encoder that generates the object features based on the object mask.

14. The system of claim 8, wherein the transformation matrix includes similarity information indicating a similarity between the first image frame and the second image frame.

15. A non-transitory computer-readable storage medium including instructions, which when executed by a processor, cause the processor to:
receive video data representing a sequence of image frames;
receive an object mask;
generate image features based on a first image frame of the sequence of image frames;
generate object features based on the object mask;
generate image features based on a second image frame of the sequence of image frames;
compute a transform matrix based on the image features of the first image frame and the image features of the second image frame;
apply the transform matrix to the object features resulting in transformed object features; and
obtain a predicted object mask associated with the second image frame by decoding the transformed object features.

16. The non-transitory computer-readable storage medium of claim 15, wherein the instructions, which when executed by a processor, cause the processor to:
receive a second object mask;
generate second object features based on the second object mask;
apply the transform matrix to the second object features based on the second object mask resulting in second transformed object features; and
obtain a second predicted object mask associated with the second image frame by decoding the second transformed object features.

17. The non-transitory computer-readable storage medium of claim 16, wherein the object features are generated based on the object mask and the image features based on the first image frame, and the second object features are generated based on the second object mask and the image features based on the first image frame.

18. The non-transitory computer-readable storage medium of claim 17, wherein the predicted object mask associated with the second image frame is based on the transformed object features and decoded image features associated with the second image frame, and wherein the second predicted object mask associated with the second image frame is based on the second transformed object features and the decoded image features associated with the second image frame.

19. The non-transitory computer-readable storage medium of claim 18, wherein the instructions, which when executed by a processor, cause the processor to obtain the predicted object mask associated with the second image frame by decoding the transformed object features at a decoder that is different than a decoder that decodes the object features associated with the second image frame.

20. The non-transitory computer-readable storage medium of claim 15, wherein the instructions, which when executed by a processor, cause the processor to generate the image features based on the first image frame of the sequence of image frames at an encoder that is different than an encoder that generates the object features based on the object mask.

* * * * *